United States Patent
Little

[11] 3,729,989
[45] May 1, 1973

[54] HORSEPOWER AND TORQUE MEASURING INSTRUMENT

[76] Inventor: Donald R. Little, 132 Chestnut Drive, Greensburg, Pa. 15601

[22] Filed: Dec. 10, 1970

[21] Appl. No.: 96,725

[52] U.S. Cl.................73/133 R, 73/116, 324/162, 324/166, 324/169
[51] Int. Cl...............................................G01l 5/13
[58] Field of Search.............73/117, 134, 133 R, 73/116

[56] References Cited

UNITED STATES PATENTS

| | | | |
|---|---|---|---|
| 3,052,117 | 9/1962 | Miller et al. | 73/136 R |
| 2,847,854 | 8/1958 | Burstyn | 73/134 |
| 2,674,125 | 4/1954 | Egan | 73/136 R |
| 3,289,471 | 12/1966 | Maxwell | 73/117 |
| 3,554,022 | 1/1971 | Geul | 73/117 |
| 2,982,128 | 5/1961 | Gibson et al. | 73/117 |

*Primary Examiner*—Jerry W. Myracle
*Attorney*—H. A. Williamson

[57] ABSTRACT

This invention relates to a readily portable apparatus and the related method of determining the useful torque and horsepower wherein the apparatus includes a first unit which provides a velocity signal directly proportional to the velocity of rotation of the prime mover and has as an output a signal indicative of the velocity of rotation of the prime mover. A second unit is coupled to the first unit to provide a signal directly proportional to acceleration. A third unit is coupled to the first and the second units, respectively, and provides an output which is directly proportional to the useful horsepower and torque developed at any given instant during operation of the prime mover.

13 Claims, 14 Drawing Figures

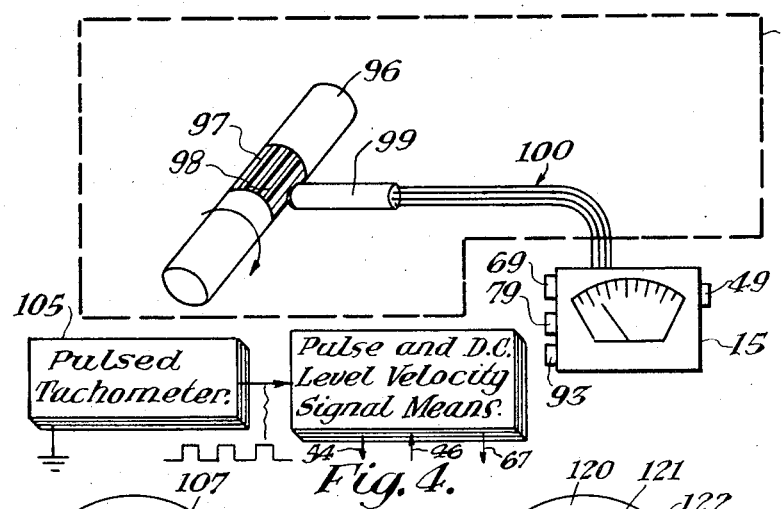
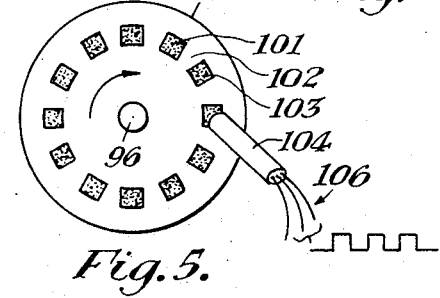
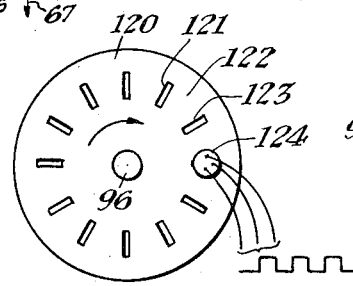
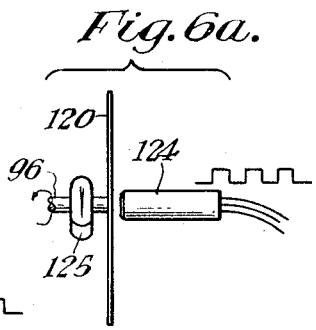
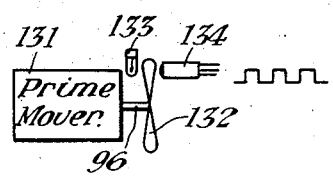
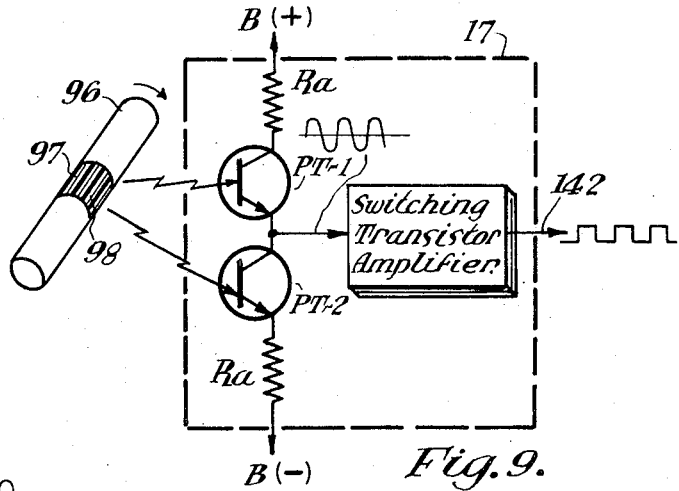
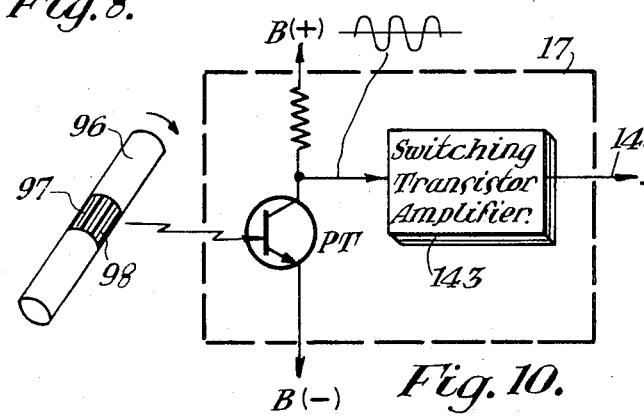

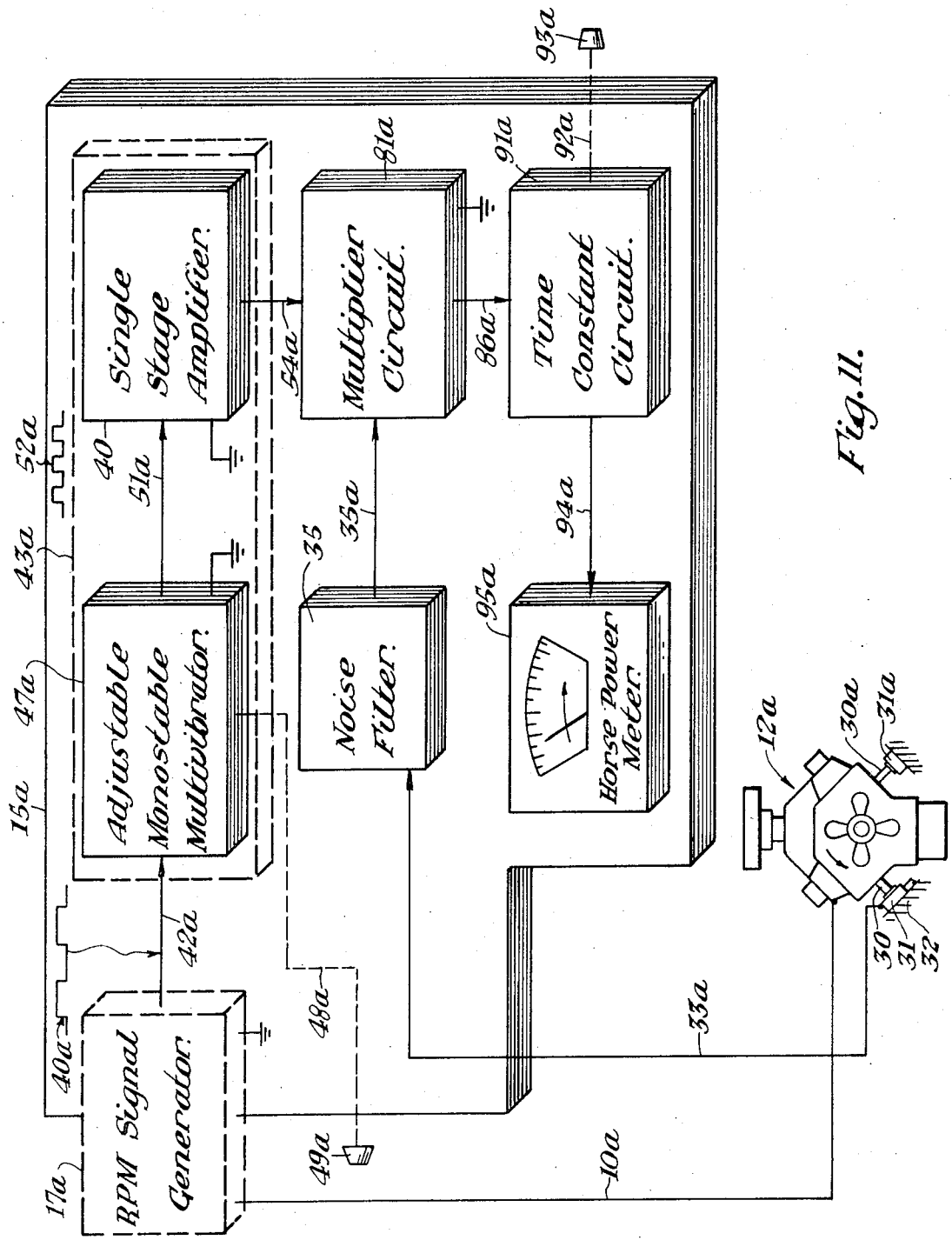

HORSEPOWER AND TORQUE MEASURING INSTRUMENT

This invention relates to both a method and apparatus for determining the useful torque and horsepower of any prime mover.

More specifically, this invention relates to a readily portable apparatus and the related method of determining the useful torque and horsepower wherein the apparatus includes a first unit which provides a velocity signal directly proportional to the velocity of rotation of the prime mover and has as an input a signal indicative of the velocity of rotation of the prime mover. A second unit is coupled to the first unit to provide a signal directly proportional to acceleration. A third unit is coupled to the first and the second units, respectively, and provides an output which is directly proportional to the useful horsepower and torque developed at any given instant during operation of the prime mover.

A study of history will show that over the years there have been repeated attempts in the horsepower and torque measuring arts to find a simple and inexpensive way to measure actual useable horsepower or torque. To this point there have been many contributions, some highly complex and others less complex, but all of them have required heavy, physically large installations that have been for the most part permanently installed in a maintenance shop or garage. There complexity and high cost have limited their use to only those individuals who made it their exclusive business to provide such service.

Therefore, many individuals, such as sports car enthusiasts, have had to do without this type of service because of the related high cost involved. The field of individuals so affected is not restricted to sports car enthusiasts but also includes, for example, trucking fleets that must carry enormous loads cross country or through hilly terrain. They are faced with meeting delivery schedules where time is of the essence. The firms that own these trucking fleets are frequently forced to operate their truck engines until they reach a point of breakdown or such loss of power as to make them uneconomical to continue operation. This instrument provides the owners of such vehicles the means to record and recognize decrease in performance over a period of operation, thereby affording them valuable insights into potential malfunctions and poor operation economy. Inherently such record keeping will allow them to avoid breakdown and the concomitant economic loss due to the loss of use of one or more vehicles. Furthermore, there has been no convenient way to determine whether there have been any significant changes in horsepower and torque which may be symtomatic of potential failure of some component of the entire drive train. The invention to be described hereafter avoids all of these problems without the need for expensive and bulky equipment to ascertain useful torque and horsepower.

An object of this invention is to provide an easily portable unit coupled to the prime mover and its related components for measuring useful torque or horsepower which may be located in the driver compartment of a vehicle while the vehicle is in motion.

Another object of this invention is to provide an easily portable unit coupled to the prime mover and its related components for measuring useful torque or horsepower with the unit conveniently placed near the engine or vehicle when the engine or vehicle is operated under a simulated load.

Still another object of this invention is to provide a portable, small in size and weight, economical instrument unit which can readily measure the useful accelerating and decelerating torque and horsepower actually available to propel or stop a vehicle.

Still yet another object of this invention is to provide an instrument unit that will detect the early changes in torque and horsepower to related possible malfunctions and indicate when action should be taken to avert situations ranging from a slight inconvenience to a serious and costly malfunction at any point along the power train.

A significant object of this invention resides in the measuring of horsepower by detecting and producing a signal directly proportional to engine rpm or vehicle speed and an acceleration signal, the product of which is indicative of useful horsepower and torque.

Another significant object of this invention resides in the measuring of horsepower by detecting and producing a signal directly proportional to engine rpm and a tractive force signal, the product of which is indicative of useful horsepower and torque.

In the attainment of the foregoing objects the preferred embodiment of the invention, that is, the instrument that determines the useful torque and horsepower of any prime mover, includes a number of basic circuit units. The first of these units is termed a pulsed and d.c. level velocity signal circuit which has an input signal indicative of the velocity of rotation delivered by the prime mover. The circuit under discussion has both a first and a second output. The first output is a d.c. level velocity of rotation signal directly proportional to the velocity of rotation of the prime mover, while the second output is a pulsed output directly proportional to the velocity. A differentiator circuit is electrically coupled to said pulsed and d.c. level signal circuit. The differentiator circuit has a d.c. level acceleration signal output. A multiplier circuit is electrically coupled to both the second pulsed output and the d.c. level acceleration signal output, to thereby provide an output signal which is a product of the second output and the acceleration d.c. level output signals. The final circuit is a time constant circuit electrically coupled to the multiplier circuit output. The time constant circuit has an output which is directly proportional to useful horsepower developed at any given instant during operation of the prime mover.

Another embodiment of the invention is also directed to a readily portable instrument for determining useful horsepower of any prime mover which delivers a driving force to a finally driven component at any point along its power train inclusive of the prime mover itself and the finally driven component. The instrument includes a pulsed d.c. velocity signal circuit which has an output directly proportional to the velocity of rotation of the prime mover and which has as an input a signal indicative of the velocity of rotation of the prime mover. In addition, there is a multiplier circuit which has a d.c. level signal input which is directly proportional to the driving force. The multiplier circuit is electrically coupled to the pulsed d.c.

velocity circuit output to provide an output signal which is a product of the pulsed d.c. level velocity signal and the d.c. level driving force signal. A time constant circuit is electrically coupled to the multiplier circuit output signal; this time constant circuit having an output which is directly proportional to the useful horsepower developed at any given instant during operation of the prime mover.

Other objects and advantages of the invention will become apparent from the ensuing description of illustrative embodiments thereof, in the course of which reference is had to the accompanying drawings in which:

FIG. 1a depicts a portion of a prime mover's ignition system utilized in conjunction with the preferred embodiment of FIG. 1.

FIG. 1b illustrates a multiplier circuited used in the embodiment of FIG. 1.

FIG. 3 shows one form of photosensitive prime mover rpm detection.

FIG. 4 shows another form of detecting prime mover rpm utilizing a tachometer.

FIG. 5 shows one form of photosensitive prime mover rpm detection.

FIG. 6 shows one form of photosensitive prime mover rpm detection.

Figure 1:
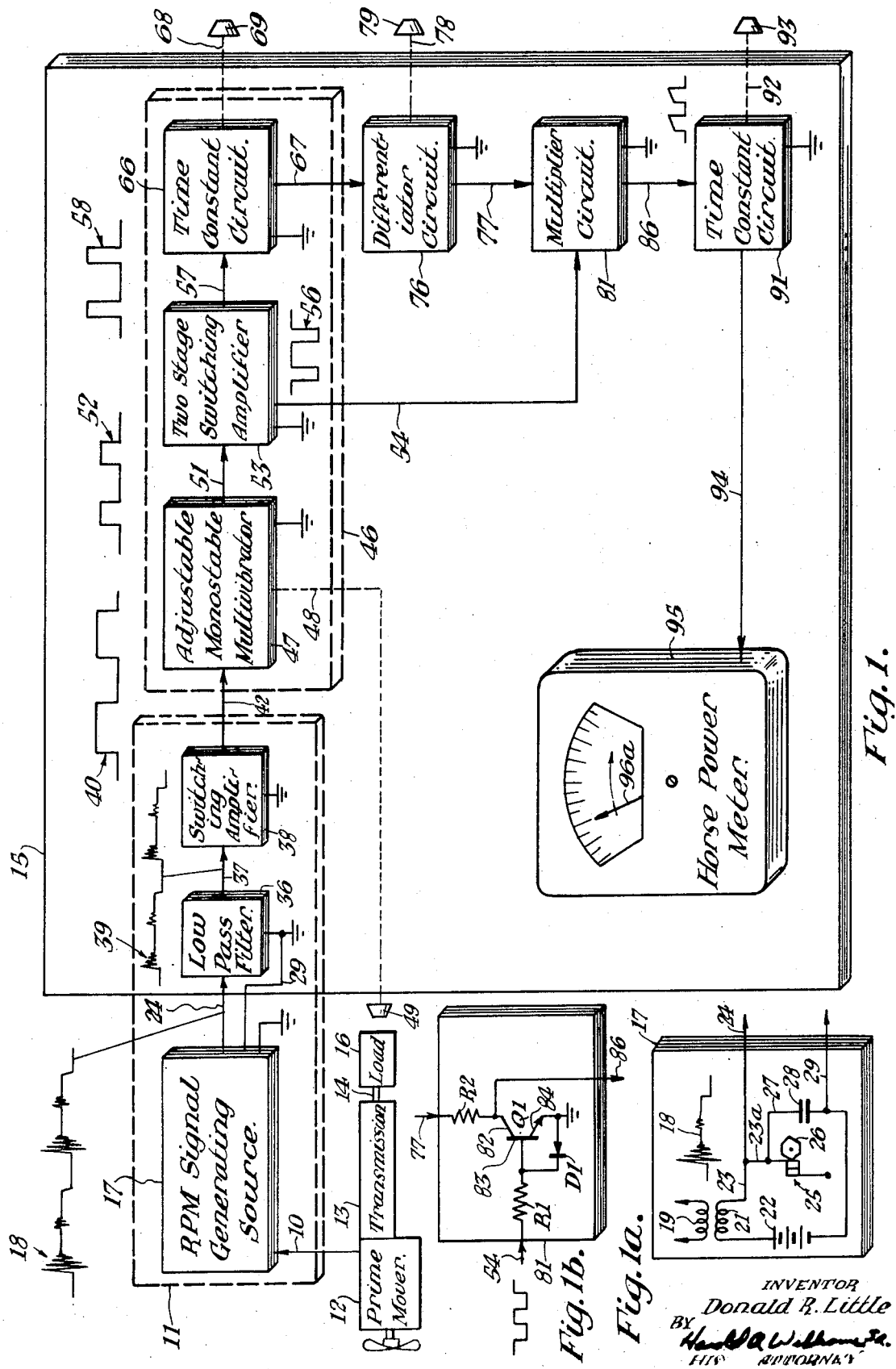
FIG. 1 illustrates the preferred embodiment of the invention in block diagram form.

FIG. 6a further illustrates the configuration as viewed from the side of FIG. 6.

FIG. 7 shows a magnetic arrangement for detecting prime mover rpm.

FIG. 8 shows one form of photosensitive prime mover rpm detection.

FIG. 9 shows one form of photosensitive prime mover rpm detection.

FIG. 10 shows still another form of photosensitive prime mover rpm detection.

FIG. 11 illustrates another highly advantageous method of detecting and determining useful prime mover horsepower.

In order to gain a full understanding of the invention it is essential that a study be made of the various parameters that are involved in the determination of useful horsepower or torque. In some instances such as that which presents itself in sports car racing where peak useful horsepower is desired, such factors as variable ambient conditions play a role in the final adjustment of all engine parameters. In the vernacular of racing these final adjustments are frequently referred to as "tweeking" the engine for optimum performance.

In the trucking industry most engines are tuned to manufacturer's specifications irrespective of the age or condition of engine or prime mover, and the condition of the drive train from the engine to the tractive wheels of the truck.

In order to understand the theory behind the implementation and operation of the invention to be described, the following mathematical analysis should be studied.

Starting with basics the following is a well-known expression of horsepower (Hp):

$$Hp = work/time \qquad (a)$$

where
work = force (F) through a distance.

One lb. force (F) used to maintain mass in motion through 1ft. of distance (D) produces 1ft-lb of work; also note time is not part of this work equation.

By definition: 550 ft. lbs. moved per second equal one horsepower or stated in an equation form:

$$550 \text{ ft-lbs force/sec} = 1 \text{ horsepower} \qquad (b)$$

Velocity (V) is measured in ft. per sec. ft. per min., ft. per hr., or more commonly the ft. parameter is changed into miles and we have miles per hour (mph).

Therefore, in the above equation (b) we see the following in the left-hand side of the equation: 550 ft-lbs-force/sec and that 550 is a constant which can be termed K and K=550. Note also ft/sec equals Velocity (V) and lbs-force is (F). Therefore, equation (b) can be rewritten in general terms as follows:

$$Hp = K V F \qquad (c)$$

By definition force (F) equals mass (M) times acceleration (A) or in equation form:

$$F = M A \qquad (d)$$

Mass by definition may be considered as the equivalent of inertia, or the resistance offered by a body to change of motion, i.e., acceleration. As is generally known, masses are compared by weighing them, which amounts to comparing the forces of gravitation acting on them.

Therefore, mass is generally stated in absolute units.

Accordingly, horsepower measured in a dynamic or accelerating mode may be designated as $Hp_{(a)}$ and since the force is also in a dynamic or accelerating mode it may be referred to as $F_{(a)}$ and then equation (c) becomes:

$$Hp_{(a)} = K F_{(a)} V \qquad (e)$$

Also, equation (d) may be rewritten to express this accelerating mode as:

$$F_{(a)} = M A \qquad (f)$$

Then by substituting equation (f) in equation (e) we have, $$Hp_{(a)} = K (MA) V \qquad (g)$$

Accordingly, acceleration horsepower $Hp_{(a)}$ can be determined, for example, by determining both acceleration (A) and velocity (V) of rotation, revolutions per minute (rpm) of the power source. This velocity measurement may be done in a variety of ways; in the invention to be discussed hereinafter an electrical signal representative of the rpm will be utilized.

It is apparent for any given set of conditions both K and M can be considered constant, i.e., $K_{(a)}$, therefore $$K_{(a)} = K M \qquad (h)$$

Therefore, substituting equation (h) in equation (g) we have $$Hp_{(a)} = K_{(a)} A V \qquad (i)$$

This states that the accelerating horsepower (which can be termed "useful horsepower" since all other horsepower produced by the engine is used up in overcoming forces due to friction and unwanted drag) can be obtained by multiplying velocity and acceleration providing the proper scale factor (which is a function of the mass or weight of the vehicle) is used. It can further be stated that a rotational inertia can be used to "simulate" the mass of the vehicle. Assume that the effective rolling radius of the drive wheels is 1 foot and that the weight of the loaded vehicle is 2,000 pounds. The torque required to accelerate that vehicle (neglecting all frictional and drag losses) is the same as having a 2,000 pound rotating mass with a radius of gyration of 1 ft. attached directly or coupled by a secondary drive to the drive wheel or wheels.

It is also an important characteristic of this invention that the accelerating torque (or accelerating force ($F_a$) also called net tractive effort) can also be separately obtained by measuring the accelerating rate.

Up until this point we have been speaking in generalities with reference to $F_{(a)}$, but it should be noted that $F_{(a)}$ is the accelerating tractive force, or in the case of a vehicle it would be referred to as the accelerating torque. When equation (f) is referred to, and the equation is stated in terms of acceleration we have $$A = F_{(a)}/M \qquad (j)$$

The usefulness of this relationship will be described more fully hereinafter as a description of the invention proceeds.

Reference is now made to FIG. 1, in which there is illustrated a preferred embodiment of the invention in block diagram form. As is evident from viewing this block diagram figure, a portion of the apparatus is shown extending beyond the main instrument 15. This main instrument 15 is comprised of a number of circuits most of which are common circuits, and as the description follows each of the circuits which is of a conventional nature will be identified, and incorporated by reference will be a notation as to where each of these circuits may be found in general text material available to the public.

It is apparent that the dashed unit 11, which will be referred to as pulsed signal source 11 hereafter, incorporates a circuit portion outside the basic instrument 15, in that it contains an rpm signal generating source 17. This rpm signal generating source 17 may, in the case of a conventional automobile, be a portion of the ignition system.

As shown here, there is also included directly beneath the rpm signal generating source 17 in block diagram form, a prime mover 12 which has a transmission 13, a shaft 14 coupling the transmission 13 to a driven load 16, which may be a real load or a simulated load, to be explained more fully hereinafter. In the event that the prime mover is not of the conventional combustion engine type normally found in automobiles, but is of the diesel type as found in many buses and trucks, then the rpm signal generating source will be a device which cooperates with a moving element of the entire power train represented by prime mover 12, transmission 13, shaft 14, and load 16. What will be critical and be described more fully hereinafter is the techniques by which one may obtain a signal directly proportional to the rpm of the prime mover which, for the purposes to be described, would be directly proportional to the speed of the vehicle. This assumes that the transmission involved is a gear transmission and not specifically an automatic transmission. Automatic transmissions will be considered separately hereinafter.

Figure 2:
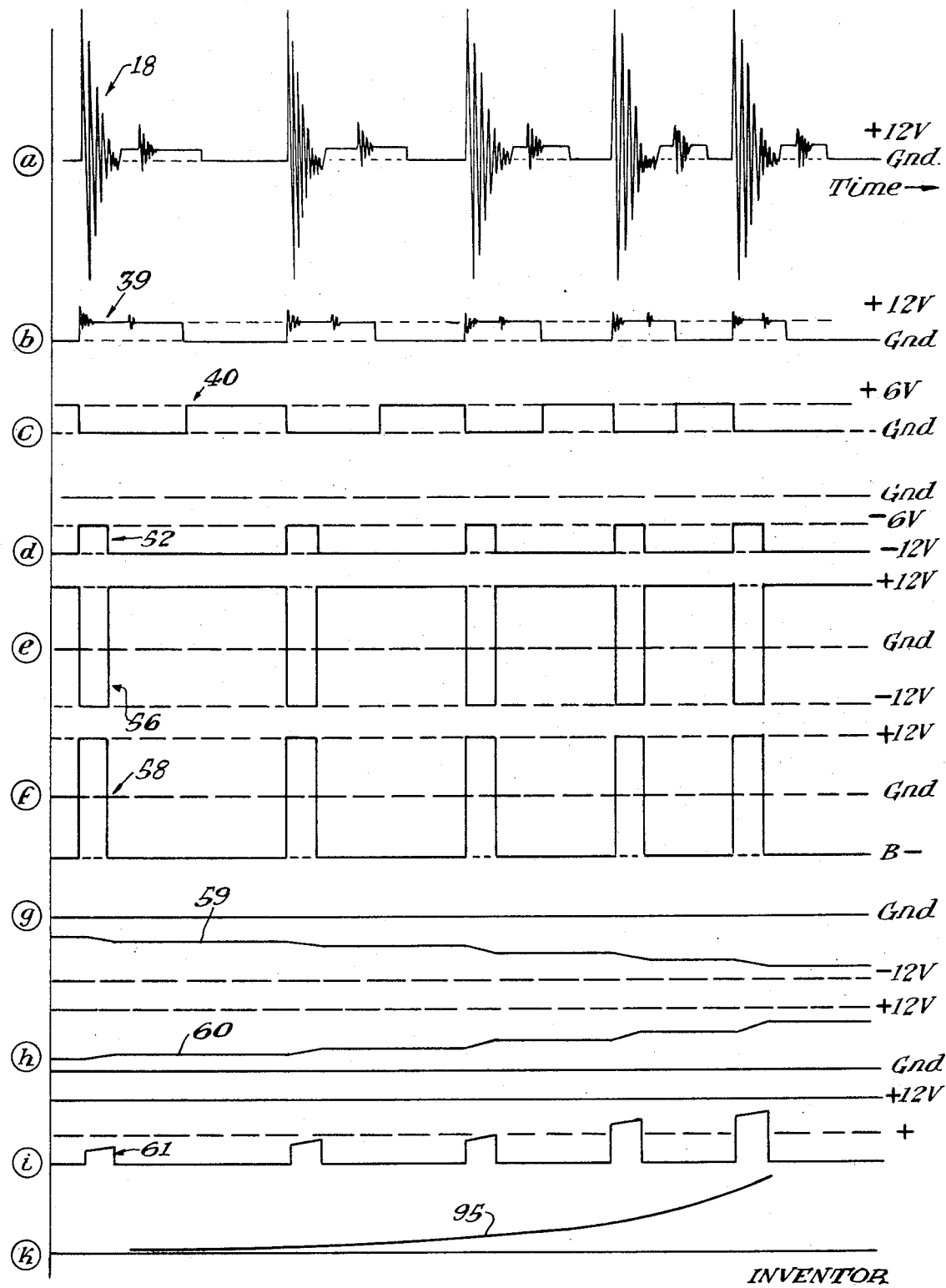
FIG. 2 represents the wave forms that are present at different points in the preferred embodiment of FIG. 1.

In order to appreciate the invention described, FIG. 1 and FIG. 2 should be studied at the same time in order that the pulses that appear and d.c. level signals that appear throughout the circuit description will have meaning with reference one to another.

As just noted, FIG. 2 represents the pulse wave forms or the signal wave forms, as the case may be, that appear in a typical automotive ignition system arrangement. The description that now follows will presume that the prime mover 12 and its related rpm signal generating source 17 are that which would be found in a conventional internal combustion engine normally found in an automobile.

In order to understand the nature of the rpm signal source and those portions of the vehicle's ignition system that are involved, a study of FIG. 1a is essential. There will be seen in FIG. 1a the rpm signal generating source 17 set out in block form which has contained therein a primary coil 21 and a secondary coil 19 which are normally found in the coil of the ignition system of the vehicle. A power supply in the form of a battery 22 is connected directly to the primary coil 21 as can be seen. Also coupled to the primary coil 21 via the lead 23, 23a is a set of breaker points 25 which are conventional in nature. These breaker points 25 are interrupted or opened and closed at a rate directly proportional to the rpm of the vehicle, and their opening and closing is controlled by the distributor cam 26 which rotates at a speed directly proportional to engine velocity, as we have referred to above, at a speed which will be representative of and directly proportional to the speed of the vehicle. As these breaker points 25 are opened and closed, there will be a pulsed output appear of the type shown in wave form 18 in FIG. 1a, as well as FIG. 1, on the lead 23. This wave form 18 is shown as an a.c. signal superimposed upon a pulsed d.c. level signal which is present because of the d.c. battery supply source 22. This a.c. signal is delivered over lead 24 to a low pass filter 36 to remove most of the a.c. component and produces an output signal on lead 37 which is depicted by the wave form 39. Note also that the rpm signal source has a separate lead 29 connected to ground of the low pass filter 36. This indicates that both the rpm signal source 17 and the low pass filter 36 and the other related circuits in this system are all electrically coupled to the same ground.

This low pass filter 36, shown contained within the instrument 15, is a conventional single or multiple stage low pass filter circuit, such as that described in electrical engineering books on network or circuit analysis. See, for example, "Network Analysis and Synthesis" by Kuo, published by Wylie & Sons. The wave form output from the low pass filter is the wave form output shown on line B of FIG. 2, as well as that which is shown in FIG. 1.

The signal wave form 39 passes along the electrical lead 37 to a switching amplifier 38 which is also grounded. The output signal from this switching amplifier is shown by wave form 40 in FIG. 1, as well as the wave form shown on line C of FIG. 2. It can be seen from a study of FIG. 2 that the wave form 40 shown on line C is generated as a consequence of the leading edge of the wave form 39 of line B in FIG. 2 entering switching amplifier 38. This wave form 40, which represents the signal, provides the base signal input for a common emitter switching transistor amplifier stage, shown here as switching amplifier 38. This type of switching transistor amplifier using the common emitter configuration is described in Chapter VI of "G. E. Transistor Manual", copyrighted in 1964, or in Section 22 of "Digital Transistor Circuits", by Harris Gray & Searle, copyrighted in 1966 by Educational Services Inc. and published by Wylie & Sons.

This switching amplifier signal 40 is used to trigger an adjustable monostable multivibrator 47 which produces a fixed time wave pulse as shown by wave form 52 in FIG. 1, and on line D of FIG. 2. It should be noted that the adjustable monostable multivibrator 47 is only one of three basic elements to what will be termed hereafter and shown in dotted outline as a pulsed and d.c. level velocity signal means 46, which includes, besides the adjustable monostable multivibrator 47, a two-stage switching amplifier 53, as well as a time constant circuit 66, both of which will be described more fully hereafter.

It is important to note the d.c. component of this output signal having wave form 40, which appears on lead 42 and is the input to the adjustable monostable multivibrator 47, is directly a function of rpm. For calibration purposes the pulse duration must be adjustable and so the adjustable monostable multivibrator has an adjusting mechanism comprised of a mechanical link 48 and a calibration knob 49 for this purpose. The analog circuits following the pulse circuit portions of the block diagram of FIG. 1 must be properly "scaled", that is to say, the voltage signal must be related to velocity in a linear relationship. This requires adjusting the d.c. content of the d.c. pulsed wave form to compensate for different gear ratios and the number of cylinders in the vehicle. Again, it should be noted that the pulse wave form 52 and its repetition rate which appear on lead 51 of the adjustable monostable multivibrator 47 is directly proportional to the rpm of the prime mover, and since we are discussing a geared transmission system, the pulse repetition rate on lead 51 is directly proportional to the velocity of the vehicle. This modified pulse width wave form 52 is delivered to a two-stage switching amplifier 53, which has a pair of outputs, namely, a first output on lead 54 which is represented by wave form 56, and wave form 58 which appears on the second output 57 of the two-stage switching amplifier 53. Both of these signals are directly related to the rpm or velocity of the vehicle. Both of these wave forms are shown on lines E and F of FIG. 2. The first output on lead 54 is shown delivered to a multiplier circuit 81 whose function will be described more fully hereafter.

It should be kept in mind for further reference that the signal on lead 54 is a pulsed d.c. level signal whose repetition rate is directly proportional to velocity (V) noted in the equations at the outset of this specification. The two-stage switching amplifier 53 is made up of two cascaded common emitter switching transistor amplifier stages, each stage being similar to the circuit used in the switching amplifier 42, which was discussed earlier. The wave form 58, which appears on lead 57, is fed to a time constant circuit 66 which extracts a d.c. level signal 59, FIG. 2, from the switching wave form represented by the wave form 58. The actual circuit used for the time constant circuit 66 employs an operational amplifier of a configuration as described by "Simple Lag", on page 46, Section II.15 of Philbrick and Nexus Research "Application Manual for Operational Amplifiers", copyrighted in 1968 by Philbrick and Nexus Research, a Teledyne Company. Any offset voltage appearing at the amplifier output can be connected by adjusting knob 69 which is connected through mechanical linkage 68 to the time constant circuit 66. Time constant circuit 66 may also take the form of the circuit configuration titled "Delay Time Element" on page 47, Section II.18 of the same manual. The output from the time constant circuit 66 is shown by wave form G in FIG. 2, and as can be seen here this signal is an analog signal having a varying d.c. level. This time constant signal represented by the curve 59 is an analog signal which is delivered to a differentiator circuit 76 where this velocity d.c. level signal is differentiated to produce an acceleration signal by the differentiator circuit 76. It should be noted that a time constant circuit (not shown) is also used in conjunction with the differentiator circuit 76 to provide a filtered d.c. output signal.

The differentiated velocity signal produces an analog signal represented by the curve 60 of FIG. 2. It will now be appreciated that this analog acceleration signal will appear on lead 77 and will be delivered to the multiplier circuit 81. Accordingly, when the basic equations referred to at the outset of this specification are studied, one will see that we have delivered to the multiplier circuit 81 a velocity signal V on lead 54 and we have an acceleration signal A on lead 77. The multiplier circuit 81 is shown in FIG. 1b where the details of the circuit are set forth. It can be seen that the multiplier circuit 81 has the velocity input on signal lead 54 and the acceleration signal on lead 77. It should be noted with reference to the differentiator 76, which provides the acceleration signal A to the multiplier circuit, that this differentiator circuit may be like that which is shown in Section II.19, page 48, and Section II.21, page 49 of Philbrick and Nexus "Application Manual for Operational Amplifiers".

At the heart of the multiplier circuit there is a transistor 21 which is turned on, i.e., saturated, while the signal from the two-stage switching amplifier 53, which is indicative of velocity and appears on lead 54, is in the positive state and this transistor is turned "off", therefore becoming blocking, when the signal on lead 54 is negative. When the transistor 21 is turned "on", the collector 82 is at approximately the same potential as the emitter 84 of the transistor Q1. During the interval when the transistor Q1 is turned "off", the collector assumes a d.c. level of the output on lead 77 from the differentiator circuit 76. This produces the output shown in wave form I of FIG. 2 which has a d.c. level which varies as the product of velocity or rpm, and acceleration A. In the multiplier circuit 81, resistor R1 acts to limit the transistor base drive current and the diode D1 acts to limit the reverse voltage applied to the base emitter junction 83-emitter junction 82 of the transistor Q1. The signal represented by the wave form 61, line I, of FIG. 2 is that applied over lead 86 to time constant circuit 91 which has an adjustable feature in that it includes mechanical link 92 and adjusting knob 93. This knob 93 is used to properly "scale" the analog horsepower output signal as a function of the mass being driven by the prime mover.

This time constant circuit is similar to the circuit described previously with reference to time constant circuit 66 with the exception that an amplifier is used as a follower as described in Section II.2, page 40 of the Philbrick and Nexus "Application Manual for Operational Amplifiers" where the gain is made variable by making the feedback resistor a fixed resistance in series with a potentiometer. This potentiometer is mechanically linked, while not shown, to mechanical linkage 92 and adjusting knob 93. The output wave form of the time constant circuit 91 reflects the weight or, as it might otherwise be stated, the mass to be driven and this mass or weight would be equal to the weight of the vehicle with the addition of the passenger or passengers that might be in the vehicle. This time constant circuit 91 is adjusted to reflect this parameter. This parameter has been treated in the earlier equations as constant $K_a$.

We will now see that the output signal 95, FIG. 2, on lead 94 is representative of useful horsepower and torque and all the elements of the basic equation $Hp_{(a)} = K_a V A$, and we now have the output which is shown on line K of FIG. 2 delivered to a conventional meter 95, which measures an analog d.c. voltage. This meter 95 is referred to as a horsepower meter, and as the load 16 is accelerated as the vehicle moves in response to its accelerating mode, there will be seen a movement of the needle 96a in the direction of the arrow shown immediately crossing the needle 96a, and as the vehicle is accelerated in the gear for which the meter was calibrated, the instantaneous useful horsepower available will be reflected by the reading shown on the horsepower meter.

Again, the calibration of this type of meter, as well as the adjustments made to such components as the adjustable monostable multivibrator and both time constant circuit and differentiator circuit, as well as the time constant circuit 92, will all be relative to useful (or accelerating) horsepower.

A most significant aspect of this invention is that the individual who is desirous of determining his maximum horsepower need only ascertain the maximum excursion of the needle 96a to determine maximum horsepower. When the vehicle, in which this instrument is carried, is taken out into a test roadway, one is really concerned with the change in horsepower as distinguished from an absolute reading of horsepower, although it should be recognized that the precision calibration of all of the adjustable circuits depicted will produce a reading that is directly indicative of the numerical value of horsepower. But of more consequence, as just noted, the driver is looking for the maximum horsepower available and this is relative to the existing horsepower being developed when the engine has not been finely tuned. This instrument provides a graphic illustration of the potential increase in horsepower when the engine is finely tuned to obtain maximum useful horsepower. Accordingly, when the vehicle is driven along a grade in one direction and a maximum horsepower is determined, the vehicle should be turned and redriven over the same stretch of test roadway and the difference in horsepower, which will be affected by such things as the amount of grade and the wind resistance force, will provide two figures from which an average may be obtained to actually result in a useful horsepower output signal that has meaning.

Reference is now made to FIG. 3 in which there is shown in dotted outline the rpm signal generator 17 which was shown in FIG. 1. This rpm signal generator may take many forms, as will be seen in the figures that will be described hereinafter. In this first embodiment of the rpm signal generator there is incorporated a rotating shaft 96. This rotating shaft 96 is shown not located at any specific point with reference to the prime mover, the transmission, or the final driven component. It is to be understood that any rotating shaft or rotating member, which rotates at a rate directly proportional to the rotational speed of the engine, will produce an output directly proportional to the velocity of the vehicle where a geared transmission is involved. This unique arrangement shown in FIG. 3 has its most significant use when one is trying to determine the engine rpm in the situation where a diesel engine or other prime mover is involved in which an ignition system is not available to produce pulses which are directly proportional in a repetitive rate to the rotational speed of the engine. Accordingly, it is seen in FIG. 3 that the shaft 96 contains a number of striped regions 97 and 98 which are retroreflective in nature and need but, it most instances, the ambient light to produce reflected light which is present as each one of the retroreflective striped regions 97 and 98, for example, passes photosensitive optical pickup 99. It should also be noted that a specific source of light (not shown) may be directed at the rotating retroreflective striped regions to provide the reflected light. The optical pickup 99 is connected via lead 100 to the portable instrument 15 which embodies the invention. It will be noted that the instrument contains the adjusting knobs 49 and 93 as depicted in FIG. 1. There will be produced from the optical pickup 99 a square wave pulsed output which may be utilized to provide the square wave pulse necessary for the adjustable monostable multivibrator 47, which is shown in FIG. 1.

A second embodiment which may be used to determine the rpm and may be substituted for the rpm signal source 17 may, for example, be that which is shown in FIG. 4, which illustrates a pulse tachometer 105 having an output with a wave form depicted beneath the pulse tachometer. This wave form is delivered to the monostable multivibrator 47. These outputs are the same as those which appear in FIG. 1.

Another form of the pickup may take the form of a rotating disc 107 secured to a rotating shaft element 96 of the type referred to with reference to FIG. 3. This disc 107 has a number of reflective regions 101, 103 which are separated by nonreflecting regions such as 102. An optical pickup 104 receives reflected ambient light or light from an internal source and produces an output signal shown to the right of FIG. 5 which is a pulsed d.c. wave form which may be utilized in the determination of the velocity of rotation of the engine.

Another embodiment of the rpm signal source is that shown in FIG. 6 and FIG. 6a wherein there is shown a disc 120 with transparent slots 121 and 123 interspersed with non-transparent regions such as 122. The slotted disc 120 is also mounted on a shaft 96 of the type described with reference to FIG. 1. The optical pickup is similar to those referred to in FIGS. 3 and 5 and is best shown in FIG. 6a where there is illustrated a light source 125 with the rotating disc 120 mounted on a rotating shaft 96. There is also illustrated an optical pickup 124 which produces the pulsed square wave output needed for operation of the circuit as described with reference to FIG. 1.

Another alternative embodiment of the pickup may take the form of a toothed disc 110, as shown in FIG. 8, which is mounted upon rotating shaft 96, referred to hereinabove. This toothed disc has permanent magnetic teeth such as 111 and 113, with regions such as 112 where there is no permanent magnetic field present. There is also provided a magnetic pickup 114 which is conventional in nature and merely detects the passage of each of the permanent magnets, such as 111 and 113, of the toothed disc 110. This magnetic pickup produces a square wave pulse output of the nature shown in FIG. 7.

Reference is now made to FIG. 8 in which one of the most advantageous forms of the invention with reference to the detection of prime mover rotation is shown. Here a prime mover 131 has a conventional shaft 96 which supports and drives a cooling fan 132. Working in cooperation with the cooling fan 132 is a light source 133 and an optical pickup 134. The passage of the blades between the light source 133 and the optical pickup 134 produces a series of repetitive pulsed signal outputs which are directly proportional to engine rpm and, as noted, where a geared vehicle is involved these pulsed outputs will be indicative of the velocity of the vehicle.

Two additional embodiments utilizing phototransistors are shown in FIG. 9 and FIG. 10. Both of these embodiments utilize the rotating shaft 96 described earlier which contains retroreflective stripes 97 and 98 which cooperate with conventional phototransistor circuits in FIG. 9 shown as PT1 and PT2 to provide a sinusoidal signal which is illustrated above the lead from the emitter of phototransistor circuit PT1 and the collector of phototransistor circuit PT2 to the switching transistor amplifier 141. This switching transistor amplifier 141 is conventional in nature and produces a pulsed square wave output on lead 142.

It will be noted that in FIG. 10, the pulsed signal source 17 can also utilize but a single photosensitive transistor PT in a conventional amplifying circuit which recognizes the passage of the rotating retroreflective stripes 97 and 98 on rotating shaft 96. This phototransistor also produces a sinusoidal signal on a lead entering the switching transistor amplifier 143 and there is an output on lead 144 which is a pulsed square wave output indicative of the repetition rate of the passage of the retroreflective stripes 97 and 98.

In a second approach to determining useful horsepower (Hp) it can be shown that equation (c) rewritten below can be used, $$Hp = KFV \qquad (c)$$

It can be well appreciated that the force(F) in this equation is a force which acts at some given distance from the central point at which the power is generated which represents the torque applied. In the case to be described the horsepower generated arises within the prime mover 12a (FIG. 11) here shown schematically. The prime mover 12a is held in place and supported by structural elements 30 and 30a which in turn rest upon resilient support mounts 31 and 31a. Support mount 31 has included therein a transducer (not shown) which is connected via lead 33a to noise filter 35 to be described more fully hereafter.

It will be observed that when the vehicle carrying the prime mover 12a is in an acceleration or steady state load condition, the force applied over a given distance from the prime mover will represent torque and this force (F) will be measured as the transducer receives the force. In regard to providing a real or artificial load to any engine it should be noted that in order to provide an artificial load, the vehicle operator may deactivate a number of cylinders, thereby creating a compressor effect in the respective cylinders. This will provide the operator with the ability to provide a static or highly repeatable test of horsepower, whereby he may ultimately compare output as he variously adjusts the prime mover. It will be noted that the deactivation of the aforementioned cylinder may be varied over the entire number of cylinders in the prime mover, of course this deactivation should be preferably done in sets to allow proper balancing of the drive train. It goes without saying that this method of loading is equally applicable to the first disclosed embodiment of the invention when acceleration and velocity are the principal parameters used in determining horsepower.

From FIG. 11 and a study of FIG. 1 it will be evident that wherever there is such equivalence the same reference numerals will be used but there will be added a subscript(a). Accordingly, the rpm signal source 17a is connected to the prime mover 12a via lead 10a.

As was noted before the prime mover 12a rests upon support mounts 31 and 31a. Support mount 31 has a transducer included therein. This transducer may be a strain gauge of the restrictive wire type or magnetostrictive type but is not necessarily limited to such types. The transducer has connected thereto electrical lead 33a which delivers an analog d.c. signal directly proportional to the force(F) which the transducer strain gauge 33 experiences as a result of the torque produced and transmitted from the prime mover 12a through prime mover support 30 to the prime mover support 30 including the aforementioned transducer. It can be seen that this analog signal, which appears on lead 33a, is directly proportional to the force F in the above-noted last equation, and this force will vary as a function of the horsepower being delivered to the prime mover support mount. The strain gauge and the force signal that is delivered to lead 33a will be filtered by a filter unit 35 which is a conventional filter to remove noise, and the output from the noise filter 35 will appear on lead 35a and this signal will be directly proportional to the force (F) applied to the transducer strain gauge in resilient support mount 31. This force signal (F) will be delivered to a multiplier circuit of the same type described in connection with FIG. 1. Briefly, a description of the operation of this device will be made with the constant thought in mind that where components described earlier in reference to FIG. 1 are shown, these will only be functionally described in the description of this embodiment.

Accordingly, there will be seen the rpm signal generator 17a produces an output signal shown by wave form 40a on lead 42a to a pulsed d.c. velocity means 43a, and the pulsed d.c. velocity means 43a contains an adjustable monostable multivibrator 47a of the same type referred to with reference to FIG. 1, and which provides a similar function. The output from the adjustable monostable multivibrator has the same wave form 52a and this wave form 52a appears on lead 51a. In view of the fact that no acceleration signal is needed to solve the equation (c), all that is required is a single stage amplifier 40 to which the pulsed signal on lead 51a is fed. The output from the single stage amplifier 54 on lead 54a is directly proportional to the velocity of the prime mover and to the velocity of the vehicle. This lead 54a enters a multiplier circuit 81a of the same type as described in detail with reference to FIG. 1. It can now be appreciated that the multiplier circuit has fed to it two of the parameters necessary to determine useful horsepower as this embodiment determines it. Therefore, on lead 54a is a pulsed velocity signal V; on lead 35a is an analog force signal F, and these two are multiplied in the multiplier circuit 81a to produce a pulsed output on lead 86a which is in turn delivered to a time constant circuit 91a, which time constant circuit is adjusted to take into account the constant $K_3$ which appears in equation (c). This time constant circuit is of the same type described with reference to FIG. 1, and is adjustable via mechanical link 92a and adjusting knob 93a. The output from the time constant circuit is an analog signal directly proportional to the horsepower and is delivered via lead 94a to a horsepower meter 95a where the horsepower is then measured.

It is apparent that this arrangement which utilizes an analog signal representative of force as is derived from the torque is a highly useful manner in which one may measure the dynamic horsepower being generated by any prime mover.

No mention has been made to this point of those types of vehicles which have automatic transmissions. In regard to these types of devices, it is well recognized that, as each of these transmission moves or transmits power over a velocity range, there is a shifting of gears within the transmission which is usually determined by a governor arrangement which causes the transition from one torque converter to another as the velocity of the vehicle increases. It should also be appreciated that there are losses incurred within the fluid coupling between a prime mover and the transmission and no direct relationship exists between motor rpm and vehicle speed. To measure vehicle speed (which is necessary in obtaining useful or accelerating horsepower) the speed sensor must be with respect to a wheel or some member on the drive train between the automatic transmission and the drive wheels. Therefore, the outputs which are shown on the horsepower meter 95a should be treated as absolute values and compared one with the other as final adjustments are made on the engine during the testing operation. Therefore, all tuning will be done to reach peak horsepower in any of the given driving ranges of the automatic transmission, and when this is accomplished one will have a prime mover which has been tuned to its maximum capacity to produce the maximum useful horsepower to the tractive wheels of the vehicle in accordance with this invention.

It will also be apparent that other modifications and changes can be made to the presently described invention and, therefore, it is understood that all changes, equivalents, and modifications falling within the spirit and scope of the present invention are herein meant to be included in the appended claims. Such changes contemplate that the entire system be mechanical in nature with related components being the full mechanical equivalent. The same holds true with reference to both hydraulic or pneumatic systems or combinations of all the above-noted arrangements.

Having thus described my invention, what I claim is:

1. A readily portable apparatus for determining the useful horsepower of any prime mover at any point along its power train inclusive of the final drive element in the power train, said apparatus including,
   a. a pulsed and d.c. level velocity signal means having an input indicative of the velocity of rotation delivered by said prime mover and a first and a second output said first output is a d.c. level velocity of rotation signal directly proportional to said velocity of rotation of said prime mover, said second output is a pulsed output directly proportional to said velocity,
   b. a differentiator means electrically coupled to said pulsed and d.c. level velocity signal means to receive said first output and having a d.c. level acceleration signal output,
   c. a multiplier circuit means coupled respectively to both said second pulsed output and said d.c. level acceleration signal outputs to thereby provide an output signal which is a multiplication of said second and said acceleration signals,
   d. a time constant circuit coupled to said multiplier circuit means output, said time constant circuit having an output which is directly proportional to said useful horsepower and torque developed at any given instant during operation of said prime mover.

2. A readily portable apparatus for determining the useful torque and horsepower of any prime mover at any point along its power train inclusive of the final drive element in the power train, said apparatus including,
   a. a pulsed signal source indicative of the velocity of rotation delivered by said prime mover at any point along said power train,
   b. a pulsed and d.c. level velocity signal means which receives said pulsed signal having a first and a second output, said first output is a d.c. level velocity of rotation signal directly proportional to said velocity of rotation at any of said points along said power train, said second output is a pulsed output directly proportional to said velocity,
   c. a differentiator means coupled to said first output of said pulsed and d.c. level velocity signal means to receive said first output and having a d.c. level acceleration signal output,
   d. a multiplier circuit means coupled respectively to both of said first and said second pulsed and d.c. level signal outputs to thereby provide an output signal which is a multiplication of said first and said second signals,
   e. a time constant circuit coupled to said multiplier circuit means output, said time constant circuit having a time constant parameter, said parameter is proportional to the mass driven by said prime mover, said time constant circuit means thereby having an output which is directly proportional to the useful horsepower or torque developed at any given instant during operation of said prime mover.

3. The apparatus claimed in claim 2, wherein said pulsed signal source has an rpm signal generating source means having a primary coil which has an output electrically coupled to breaker points, said breaker points controlling said output from said primary coil to provide a pulsed output which is directly proportional to the revolutions per minute at which said internal combustion engine is operating, said pulsed output having an a.c. portion which is superimposed on the d.c. level at which said engine ignition d.c. power supply is operating,
  a. a low pass filter means electrically coupled to said pulsed output which substantially recovers a d.c. wave form while rejecting the a.c. component of said pulsed output and thereby producing a low pass filter output,
  b. a switching amplifier means electrically connected to said low pass filter output to thereby extract the d.c. level from the switching wave form to thereby produce a pulsed signal output that has a repetition rate equal to the velocity of rotation of said internal combustion engine.

4. The apparatus claimed in claim 2, wherein said pulsed and d.c. level velocity signal means includes an adjustable monostable multivibrator electrically coupled to said pulsed signal output and having a square wave output with a repetition rate directly proportional to the velocity of rotation of said engine,
  a. a two-stage switching amplifier electrically coupled to said square wave output and having a primary output which is a pulsed output directly proportional to said velocity and a secondary output which is said second output of said pulsed and d.c. level velocity signal means,
  b. a time constant circuit electrically coupled to said primary output and having an output which is said first output of said d.c. level velocity signal means.

5. The apparatus claimed in claim 2, wherein said pulsed signal source includes an rpm signal generating source means which is a pulsed tachometer.

6. The apparatus claimed in claim 2, wherein said pulsed signal source includes an rpm signal generating source means which includes a rotating element driven at a speed directly proportional to engine rpm, said rotating element having regions thereon spaced such that a detecting means in a region near said rotating means will detect the passing of said regions and produce said pulsed signal.

7. The apparatus of claim 6, wherein said rotating element is a shaft having regions that are of retroreflective material and said detecting means is a photosensitive optical pickup to produce said pulsed signal.

8. The apparatus of claim 7, wherein said rotating element is a disc with a plurality of peripheral reflective and nonreflective regions and said detecting means is a photosensitive optical pickup to produce said pulsed signal.

9. The apparatus of claim 6, wherein said rotating element is a disc with a plurality of peripherally spaced transparent regions and said detecting means has a light source positioned on one side of said disc near said peripherally spaced transparent regions and said detecting means is an optical pickup which produces said pulsed signal.

10. The apparatus of claim 6, wherein said rotating element is a disc with a peripheral toothed portion, each tooth having a permanent magnetic characteristic and said detecting means is a magnetic field sensing means which produces said pulsed signal output.

11. The apparatus of claim 6, wherein said rotating element is a shaft having regions that are of retroreflective material and said detecting means is a switching phototransistor means electrically coupled to a switching amplifier which produces said pulsed output.

12. The apparatus of claim 6, wherein said rotating element is a cooling fan of any prime mover and has a light source on one side of said fan and said detecting means is an optical pickup which produces said pulsed signal.

13. A readily portable apparatus for determining the useful horsepower of any prime mover which delivers a driving force to a finally driven component at any point along its power train inclusive of said prime mover itself and said final driven component, said apparatus including,
  a. means to provide a pulsed d.c. velocity signal output directly proportional to the velocity of rotation of said prime mover and having an input signal received from any point along said power train indicative of said velocity of rotation of said prime mover,
  b. means to provide a d.c. level signal directly proportional to said driving force,
  c. multiplier means receiving said d.c. level signal input, said multiplier means electrically coupled to said pulsed d.c. velocity means output to provide an output signal which is a product of said pulsed d.c. level velocity signal and said d.c. level driving force signal,
  d. a time constant circuit coupled to said multiplier circuit means output signal, said time constant circuit having an output which is directly proportional to said useful horsepower developed at any given instant during operation of said prime mover.

* * * * *